(12) United States Patent
Shnayder et al.

(10) Patent No.: US 7,971,422 B2
(45) Date of Patent: Jul. 5, 2011

(54) MARINE SAFETY DEVICE ATTACHMENT WITH AUTOMATIC RELEASE CAPABILITY

(75) Inventors: Taila Shnayder, E. Hanover, NJ (US); Mark S. Raskin, New York, NY (US)

(73) Assignee: General Pneumatics Corp., Orange, NJ (US)

( * ) Notice: Subject to any disclaimer, the term of this patent is extended or adjusted under 35 U.S.C. 154(b) by 0 days.

(21) Appl. No.: 12/823,513

(22) Filed: Jun. 25, 2010

(65) Prior Publication Data
US 2010/0257836 A1 Oct. 14, 2010

Related U.S. Application Data

(63) Continuation of application No. 12/198,693, filed on Aug. 26, 2008, now Pat. No. 7,743,597.

(51) Int. Cl.
*F16G 11/00* (2006.01)
*A01K 75/00* (2006.01)
(52) U.S. Cl. ............. 59/78; 59/84; 59/86; 59/93; 59/95; 43/4.5; 43/44.83; 24/3.4
(58) Field of Classification Search .......... 59/78, 83, 59/84, 93, 95; 43/4.5, 43.12, 44.83; 24/3.4
See application file for complete search history.

(56) References Cited

U.S. PATENT DOCUMENTS

| 1,090,377 | A | 3/1914 | Blackburn |
| 1,355,004 | A | 10/1920 | Sandford |
| 1,511,917 | A | 10/1924 | Smith et al. |
| 1,688,461 | A | 10/1928 | Hutton |
| 1,859,143 | A | 5/1932 | Howe |
| 2,130,040 | A | 9/1938 | Siler |
| 2,222,393 | A | 11/1940 | Benjamin |
| 2,347,088 | A | 4/1944 | Mortimer |
| 2,398,897 | A | 4/1946 | St. Pierre |

(Continued)

FOREIGN PATENT DOCUMENTS

BE 563098 6/1958

(Continued)

OTHER PUBLICATIONS

International Search Report and Written Opinion dated Nov. 5, 2010 issued for International Patent Application No. PCT/US10/28500 filed Aug. 26, 2009.

*Primary Examiner* — David B Jones
(74) *Attorney, Agent, or Firm* — K&L Gates LLP

(57) ABSTRACT

A device for fastening emergency equipment to a vessel includes a hydrostatic release mechanism, a tether, and a float-free link. The tether is attached to the hydrostatic release mechanism and provides an attachment point for lashing the emergency equipment to the vessel. The tether may also be threaded through openings in the curved partially tubular body of the float-free link. A breakable bridge is integrally coupled to the body of the float-free link to form a closed loop. The breakable bridge is designed to be the break point when the emergency equipment needs to be freed from a vessel that has sunk below a predetermined depth. When the vessel sinks below the predetermined depth, the hydrostatic release mechanism severs the tether thus freeing the emergency equipment from one point of attachment to the vessel. The bridge is designed to break when the strain on the fastening line, e.g., the painter line, is between a predetermined minimum force and maximum force.

24 Claims, 5 Drawing Sheets

U.S. PATENT DOCUMENTS

| | | | |
|---|---|---|---|
| 2,621,471 | A | 12/1952 | Mortimer |
| 2,768,468 | A * | 10/1956 | Kibler et al. .................. 43/43.12 |
| 2,926,565 | A | 3/1960 | Thorness |
| 3,343,188 | A | 9/1967 | Tuck |
| D208,815 | S | 10/1967 | Hubbard |
| 3,385,325 | A | 5/1968 | Sherrill |
| 3,595,097 | A | 7/1971 | Kumakichi |
| 3,656,293 | A | 4/1972 | Lowery, Sr. |
| D231,839 | S | 6/1974 | Kissin |
| 3,885,484 | A | 5/1975 | Sturgis |
| 3,921,792 | A | 11/1975 | Anderson et al. |
| 3,994,127 | A | 11/1976 | Gower |
| 4,035,092 | A | 7/1977 | Adams, Jr. |
| 4,056,929 | A | 11/1977 | Chrobak et al. |
| 4,079,364 | A | 3/1978 | Antenore |
| 4,124,911 | A | 11/1978 | Wildhagen |
| 4,265,134 | A | 5/1981 | Dupoyet |
| 4,272,952 | A | 6/1981 | Graham |
| 4,352,382 | A | 10/1982 | Weidler |
| 4,353,203 | A | 10/1982 | Lotoski |
| 4,368,769 | A | 1/1983 | Rookasin |
| 4,416,319 | A | 11/1983 | Hofmann |
| 4,418,526 | A | 12/1983 | Clement |
| 4,498,284 | A | 2/1985 | Gearhart |
| 4,536,921 | A | 8/1985 | Brendel et al. |
| D287,102 | S | 12/1986 | Albertini |
| 4,627,232 | A | 12/1986 | Bruce |
| 4,690,091 | A | 9/1987 | Persbeck |
| 4,706,451 | A | 11/1987 | Stromberg et al. |
| 4,757,681 | A | 7/1988 | Matsuno et al. |
| 4,903,382 | A | 2/1990 | Held et al. |
| 5,098,349 | A | 3/1992 | Wu |
| 5,177,317 | A | 1/1993 | Walker et al. |
| D337,717 | S | 7/1993 | Issard |
| D346,734 | S | 5/1994 | Rohr |
| 5,348,502 | A | 9/1994 | Wigram |
| 5,365,873 | A | 11/1994 | Wigram |
| 5,367,798 | A | 11/1994 | Hughes |
| 5,438,949 | A | 8/1995 | Day |
| 5,507,671 | A | 4/1996 | Chadbourne et al. |
| 5,553,360 | A | 9/1996 | Lucas et al. |
| 5,573,343 | A | 11/1996 | Davis et al. |
| 5,873,232 | A | 2/1999 | Bruce |
| 5,913,670 | A * | 6/1999 | Anderson et al. ................. 43/4.5 |
| D412,656 | S | 8/1999 | Sokurenko |
| 5,988,929 | A | 11/1999 | Doan |
| 6,161,372 | A | 12/2000 | Wehler |
| 6,219,957 | B1 * | 4/2001 | Faircloth et al. ............. 43/44.93 |
| 6,224,442 | B1 | 5/2001 | Simpson et al. |
| D445,018 | S | 7/2001 | Fiorentino et al. |
| 6,386,086 | B2 | 5/2002 | Garcia et al. |
| 6,457,896 | B1 * | 10/2002 | deDoes ............................ 403/2 |
| D474,394 | S | 5/2003 | Smith |
| 6,564,500 | B1 * | 5/2003 | Ames ........................... 43/43.12 |
| D486,055 | S | 2/2004 | Fiorentino et al. |
| D492,188 | S | 6/2004 | Goldberg |
| 6,779,294 | B2 | 8/2004 | Ames |
| 6,878,024 | B1 | 4/2005 | Kohuth |
| 6,898,827 | B1 | 5/2005 | Postelwait et al. |
| D529,362 | S | 10/2006 | Barber et al. |
| 7,302,739 | B2 * | 12/2007 | Christiansson ............. 24/136 R |
| D565,392 | S | 4/2008 | Shetler |
| D604,143 | S * | 11/2009 | Shnayder ....................... D8/349 |
| 7,743,597 | B2 * | 6/2010 | Shnayder et al. .................. 59/93 |
| 2004/0200126 | A1 * | 10/2004 | Ames ........................... 43/43.12 |

FOREIGN PATENT DOCUMENTS

| | | |
|---|---|---|
| EP | 1 193 172 A2 | 4/2002 |
| JP | 04050094 | 2/1992 |
| WO | 2004/063003 | 7/2004 |

* cited by examiner

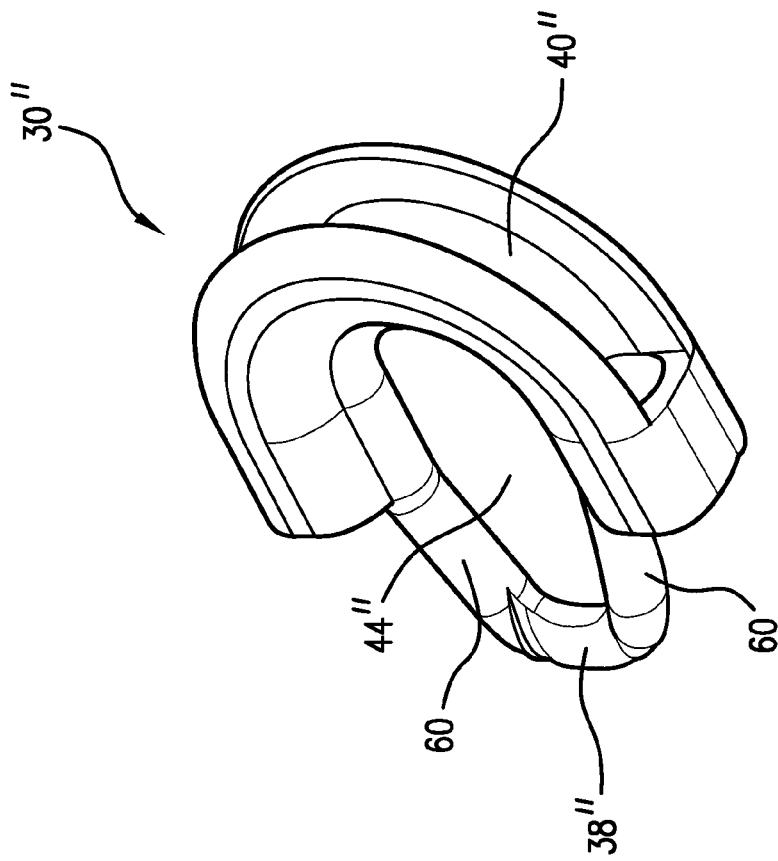
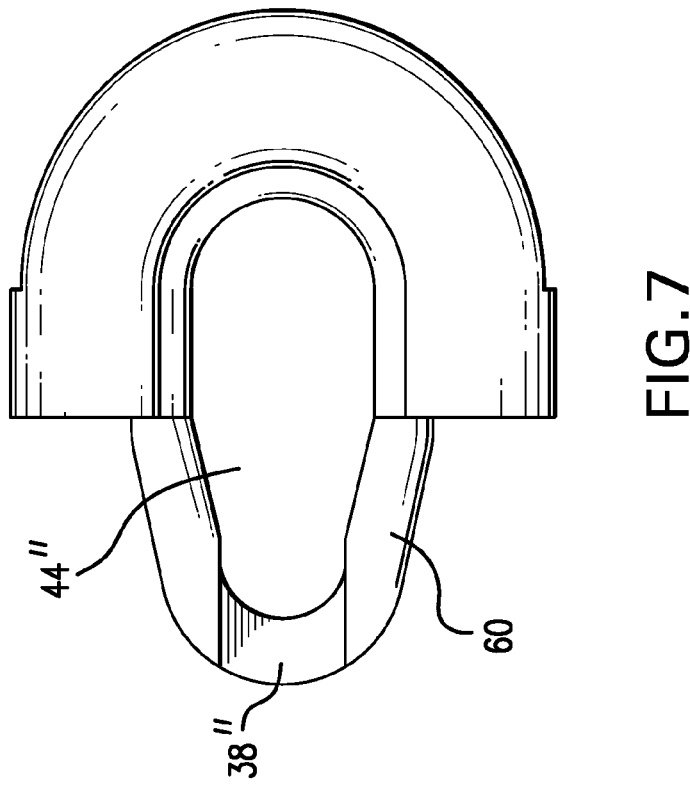

MARINE SAFETY DEVICE ATTACHMENT WITH AUTOMATIC RELEASE CAPABILITY

PRIORITY CLAIM AND CROSS-REFERENCE TO A RELATED APPLICATION

This application is a continuation of application Ser. No. 12/198,693 filed on Aug. 26, 2008, U.S. Pat. No. 7,743,597, dated Jun. 29, 2010. This application claims priority to said application under 35 U.S.C. §120. The entire contents of the original disclosure of said applications is expressly incorporated herein in its entirety by reference thereto.

BACKGROUND

Chapter 1 of Title 46 of the Code of Federal Regulations (46 C.F.R.) governs marine safety as enforced by the Coast Guard. Vessels are required to pass inspection and maintain a Certificate of Inspection, which describes the vessel, the manning requirements, and the safety equipment and appliances required to be on board, among other things. See 46 C.F.R. §2.01-5. Safety equipment includes such things as survival crafts (e.g., lifeboats or life rafts), emergency position indicating radio beacons (EPIRB), and life buoys. The regulations require lifeboats or life rafts on a vessel to do two things: float free and automatically inflate if the vessel sinks. 46 C.F.R. §180.130. Similar behavior is needed from EPIRBs, life buoys and other types of marine emergency safety equipment. See, for example, 46 C.F.R. §180.64.

SUMMARY

A float-free link for use in fastening emergency equipment to a vessel is described. In one example embodiment, the float-free link has first linkage means for allowing a first fastener to be attached thereto, second linkage means for allowing a second fastener to be attached thereto, threading means for allowing a third fastener to be threaded through a portion of both the first and second linkage means, and breakaway means for controlled breaking of the float-free link between a specified minimum and a specified maximum force.

As a further example, the first linkage means may be a first closed loop having a first aperture through which the first fastener may be attached to the first closed link. The second linkage means may be a second loop integrally coupled to the first closed loop. The second loop has a second aperture through which the second fastener may be attached to the second loop. The threading means may be continuous channel extending around at least a portion of the first aperture and a portion of the second aperture, to allow the third fastener, for example, a rope, a cord, cable or wire to be threaded through the channel. The breakaway means may be a breakaway bridge that is integrally connected to the second loop to form a closed loop. The breakaway bridge may be the designed break point in the float-free link. To accomplish that function, the breakaway bridge has a tensile strength that is less than that of either the first link or the second link. Furthermore, the breakaway bridge needs to break when a specified force is applied.

The float-free link may be used in combination with a hydrostatic release mechanism to provide a hydrostatically-releasable device that may be used to fasten an emergency device to a vessel. The hydrostatic release mechanism may be attached to a tether that is configured to mechanically couple the emergency device to the vessel. The hydrostatic release mechanism may be configured to sever the tether in an emergency, e.g., when the hydrostatic release mechanism is submerged below a predetermined depth. A first external fastener may be mechanically coupled both to the vessel and to the float-free link by way of attachment to the link through a first aperture in the link. A second external fastener may be mechanically coupled to the emergency device and to the float-free link by way of attachment to the link through the same aperture in the link or through a second aperture in the link. A channel through which the tether may be threaded may be provided in the body of the float-free link. A breakaway bridge may be integrally formed in the float-free link and may be configured to break when the strain exerted by the second external fastener, after the tether has been severed, exceeds the tensile strength of the bridge.

In another example embodiment, a float free link may be provided. The float free link may include a first closed loop including a first aperture configured to receive a first fastener therethrough; a second loop integrally coupled to the first closed loop, the second loop having first and second ends and including a second aperture configured to receive a second fastener therethrough; a channel extending around at least a portion of the first aperture, said channel configured to receive a third fastener therein; and a breakaway bridge connecting the first and second ends of the second loop to form a closed loop, wherein the bridge is designed to break between a minimum and a maximum strain force exerted on the link by the first and second fastener and wherein the bridge is substantially weaker in tensile strength than the first loop and the second loop.

Optionally, the float-free link may have at least a partial toroidal configuration. The float-free link may be unitary integrally molded structure, which may be composed of a plastic material that is substantially stable to ultraviolet light, such as a polycarbonate plastic. In one alternative configuration, the minimum force needed to break the link is at least 100 lbs and the maximum force but no more than 134 lbs. In a second alternative configuration, the minimum force is at least 200 lbs and the maximum force is no more than 268 lbs. In a third alternative configuration the minimum force is at least 400 lbs and the maximum force is no more than 536 lbs. These ranges may correspond to different sized pieces of emergency equipment with different buoyancies.

Optionally, the first aperture may be substantially circular and the second aperture may be elongated. The channel may extend around at least a portion of the second loop. Preferably, the channel does not extend around a portion of the second loop where the breakaway bridge is located.

Another example embodiment of the present invention is a float free link having a first linkage means for allowing a first fastener to be attached thereto; a second linkage means for allowing a second fastener to be attached thereto, wherein the second linkage means is integrally coupled to the first linkage means; a threading means for allowing a third fastener to be threaded through a portion of both the first linkage means and the second linkage means; and a breakaway means for controlled breaking of the float-free link between a minimum and a maximum force and at a specific location on the float-free link. Optionally, the first linkage means and the second linkage means form a unitary integrally molded structure, which may be composed of a plastic material that is substantially stable to ultraviolet light, such as a polycarbonate. In one variation, the minimum force is at least 100 lbs and the maximum force is no more than 134 lbs. In a second variation the minimum force is at least 200 lbs and the maximum force is no more than 268 lbs. In a third variation, the minimum force is at least about 400 lbs and the maximum force is no more than about 536 lbs. Optionally, the threading means extends around at least a portion of the second linkage means, although preferably not around the portion of the second linkage means where the breakaway means is located.

Another example embodiment of the present invention is a hydrostatically-releasable device for fastening an emergency device to a vessel. The example device may include a tether configured to mechanically couple the emergency device to the vessel; a hydrostatic release mechanism attached to the tether, the hydrostatic release mechanism configured to sever the tether when the hydrostatic release mechanism is submerged below a predetermined depth; a first external fastener mechanically coupled to the vessel; a second external fastener mechanically coupled to the emergency device; and an integrally formed float-free link having a first closed link including a first aperture having the first external fastener mechanically coupled thereto; a second link coupled to the first closed link, the second link having first and second ends and including a second aperture having the second external fastener mechanically coupled thereto; a channel extending around at least a portion of the first aperture, said channel having a portion of the tether threaded therethrough; and a breakaway bridge connecting the first and second ends of the second link to form a closed loop in the second link, wherein the bridge is designed to break between a minimum and a maximum force resulting from strain exerted by the second external fastener once the tether has been severed by the hydrostatic release mechanism.

Optionally, the float-free link has a hollow tubular body which forms the channel through which the tether is threaded. The hollow tubular body may be partially open along its length and may also be toroidal in shape. The breakaway bridge may have a tensile strength substantially less than that of the first or second link, which may be achieved have a substantially reduced cross-section as compared to that of the first or second link. More particularly, the breakaway bridge may be dimensioned only to break after the minimum force has been exceeded and before the maximum force has been exceeded. In one variant, the minimum force is within a first range of 100 lbs to 400 lbs and the maximum force is within a second range of 134 lbs to 536 lbs, and the minimum force is less than the maximum force. Optionally, the tether may be a rope, wire, webbing, or other sort of attachment mechanism. The hydrostatic release mechanism may be attached to the tether at a point along the tether that is outside of the channel of the float-free link.

Another example embodiment of the present invention is a hydrostatically-releasable device for fastening an emergency device to a vessel. The device may include a tether configured to mechanically couple the emergency device to the vessel; a hydrostatic release mechanism attached to the tether, the hydrostatic release mechanism configured to sever the tether when the hydrostatic release mechanism is submerged below a predetermined depth; and a first external fastener mechanically coupled to the vessel; a second external fastener mechanically coupled to the emergency device; and an integrally formed float-free link having a first linkage means for allowing a first fastener to be attached thereto; second linkage means for allowing a second fastener to be attached thereto, wherein the second linkage means is integrally coupled to the first linkage means; threading means for allowing a portion of the tether to be threaded through a portion of the first linkage means; and breakaway means for controlled breaking of the float-free link at a specific location on the float-free link and between a minimum and a maximum force resulting from strain caused by the second external fastener once the tether has been severed by the hydrostatic release mechanism.

Another example embodiment of the present invention is a float-free link. The float free link may include a curved link body having an aperture configured to receive at least one fastener therethrough and a channel extending around at least a portion of the aperture, said channel configured to receive a second fastener therein; and a breakaway bridge integrally formed with the curved link body to form a closed loop, wherein the breakaway bridge is designed to break between a minimum and a maximum force and wherein the breakaway bridge is substantially weaker in tensile strength than the curved link body. Optionally, the channel does not extend around the breakaway bridge. The aperture may be narrower at a first end and the breakaway bridge may be located at the first end. The curved link body may have a cross-bar to divide the aperture into first aperture and second aperture, wherein each aperture is configured to receive a fastener therethrough. The first aperture is substantially circular and the second aperture is elongated. The float free link may have at least a partial toroidal configuration and may be a unitary integrally molded structure, for example a plastic material that is substantially stable to ultraviolet light such as nylon or a polycarbonate.

In one variant of the float-free link, the minimum force is at least 100 lbs and the maximum force is no more than 134 lbs. In a second variant, the minimum force is at least 200 lbs and the maximum force is no more than 268 lbs. In a third variant, the minimum force is at least 400 lbs and the maximum force is no more than 536 lbs.

Another example embodiment of the present invention is a float-free link, having a first linkage means for allowing a first fastener to be attached thereto; threading means for allowing a second fastener to be threaded through a portion of the linkage means; and breakaway means for controlled breaking of the float-free link between a minimum and a maximum force and at a specific location on the float-free link. The float free link may also have second linkage means for allowing a third fastener to be attached thereto, wherein the second linkage means is integrally coupled to the first linkage means. The first linkage means and the second linkage means may form a unitary integrally molded structure, for example from plastic material that is substantially stable to ultraviolet light, such as nylon or polycarbonate.

In one variant, the minimum force is at least 100 lbs and the maximum force is no more than 134 lbs. In a second variant the minimum force is at least 200 lbs and the maximum force is no more than 268 lbs. In a third variant, the minimum force is at least 400 lbs and the maximum force is no more than 536 lbs.

Another example embodiment of the present invention is a hydrostatically-releasable device for fastening an emergency device to a vessel. The device includes a tether configured to mechanically couple the emergency device to the vessel; a hydrostatic release mechanism attached to the tether, the hydrostatic release mechanism configured to sever the tether when the hydrostatic release mechanism is submerged below a predetermined depth; a first external fastener mechanically coupled to the vessel; a second external fastener mechanically coupled to the emergency device; and an integrally formed float-free link having a curved link body having at least one aperture configured to mechanically couple the float-free link to the first external fastener, and a channel extending around at least a portion of the at least one aperture, said channel configured to receive a portion of the tether threaded therethrough; and a breakaway bridge integrally formed with the curved link body to form a closed loop, wherein the breakaway bridge is designed to break between a minimum and a maximum force resulting from strain exerted by the second external fastener once the tether has been severed by the hydrostatic release mechanism.

Optionally, the curved link body is partially a hollow tubular body which forms the channel through which the tether is threaded. The hollow tubular body may be partially open along its length and partially toroidal in shape. The breakaway bridge may have a tensile strength substantially lower than that of the first or second link and a substantially reduced cross-section as compared to that of the first or second link. The breakaway bridge may be dimensioned only to break after the minimum force has been exceeded and before the maximum force has been exceeded.

Optionally, the minimum force is within a first range of about 100 lbs to 400 lbs and the maximum force is within a second range of about 134 lbs to 536 lbs, and the minimum force is less than the maximum force. In one variant, the minimum force is at least 100 lbs and the maximum force is no more than 134 lbs. In a second variant the minimum force is at least 200 lbs and the maximum force is no more than 268 lbs. In a third variant the minimum force is at least 400 lbs and the maximum force is no more than 536 lbs.

Optionally, the tether may be a rope, wire, line, webbing or other attachment. The hydrostatic release mechanism may be attached to the tether at a point along the tether that is outside of the channel of the float-free link. The curved link body may have a cross-bar to divide the aperture into first aperture and second aperture, wherein the first aperture is configured to mechanically couple with the first external fastener and wherein the second aperture is configured to mechanically couple with the second external fastener.

Another example embodiment of the present invention is a hydrostatically-releasable device for fastening an emergency device to a vessel. The device may include a tether configured to mechanically couple the emergency device to the vessel; a hydrostatic release mechanism attached to the tether, the hydrostatic release mechanism configured to sever the tether when the hydrostatic release mechanism is submerged below a predetermined depth; and a first external fastener mechanically coupled to the vessel; a second external fastener mechanically coupled to the emergency device; and an integrally formed float-free link having linkage means for allowing the first external fastener to be mechanically coupled thereto; threading means for allowing the tether to be threaded through a portion of the linkage means; and breakaway means for controlled breaking of the float-free link at a specific location on the float-free link and between a minimum force and a maximum force resulting from strain caused by the second external fastener once the tether has been severed by the hydrostatic release mechanism.

Features and advantages of example embodiments of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings in which:

FIG. 6 is a perspective drawing of a third float-free link, according to another example embodiment of the invention.

FIG. 7 is a top view of the float-free link of FIG. 6.

DETAILED DESCRIPTION OF EXAMPLE EMBODIMENTS

Figure 1:
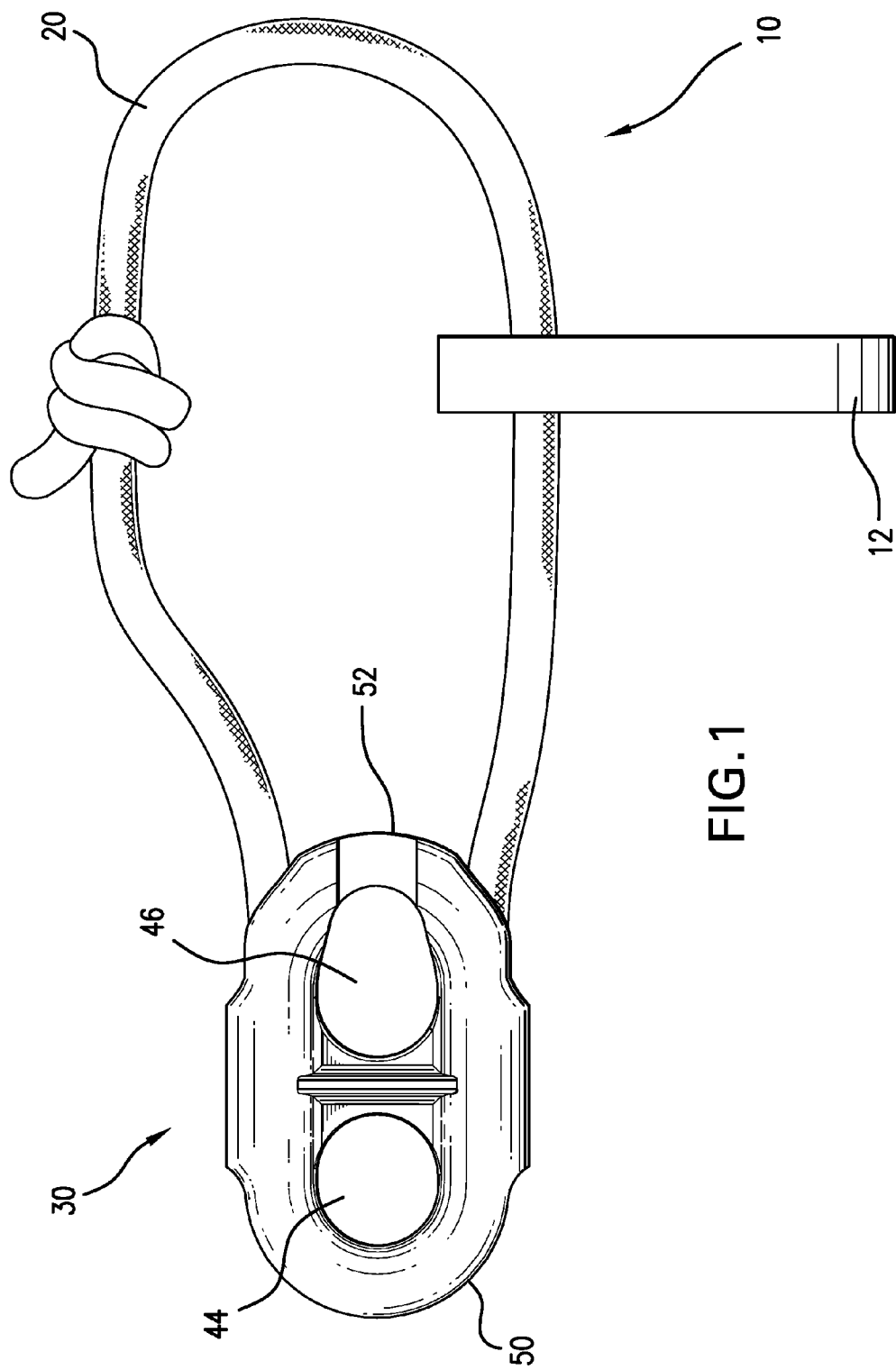
FIG. 1 is an illustration of a hydrostatic release unit, according to an example embodiment of the invention.

Some example embodiments of the present invention generally relate to a device for fastening emergency equipment, such as life rafts, life buoys or radio beacons, to a vessel or its deck. The fastening device may include a breakable or float-free link used in combination with other fasteners, such as ropes, wires, or cable, and a hydrostatic release mechanism, which is designed to sever a tether securing floatable emergency equipment from a vessel when the vessel is submerged to a predetermined depth. A rope, cable or other fastener may be attached to the hydrostatic release mechanism and provides an attachment point for lashing the emergency equipment to the vessel. The float-free link may be a unitary integrally formed tubular link having at least two separate apertures to provide areas of attachment for external fasteners. In some example embodiments, the float-free link may also include a third place of attachment, a curved tubular body that may be configured to provide a built-in continuous channel through which a rope or other fastener may thread through the tubular body, mechanically coupling the fastener to the link. The ends of the curved tubular body are connected together via a breakable bridge. The breakable bridge may be configured to be a break point when the emergency equipment needs to be freed from a vessel that has sunk below a predetermined depth, e.g., after the tether has been severed and when the buoyancy of the emergency equipment exerts sufficient force on the breakable bridge to cause its failure. While in the example embodiments, the breakaway bridge is shown at the end point, it will be appreciated that the breakaway bridge could alternatively be placed at other locations in a float-free link.

In use, the emergency equipment, such as a life raft, may be attached to the vessel via the tether threaded through the tube. The tether is configured so that it may be severed by the hydrostatic release mechanism in an emergency situation. In addition, the painter line of the life raft may be attached via an external fastener, such as a shackle, to one end of the float-free link where the breakaway bridge is located. The other end of the float-free link is fastened to a strong point on the deck of the vessel via another external fastener, typically a shackle. The tether line may be threaded through the tube and may be attached to the vessel. The tether line may also provide reinforcement at that tubular end of the float-free link to prevent its unintended breakage. When the vessel sinks below a certain depth, the hydrostatic release mechanism severs the tether line thus freeing the life raft from one point of attachment to the vessel. The bridge is designed to break when the strain on the painter line is between a predetermined minimum force and maximum force, thus allowing the emergency equipment or device to float free on the water surface instead of being pulled down with the sinking vessel. It will be appreciated that the configuration may be reversed, where the second line securing the float-free link to the vessel may be on the side of the float-free link with the breakable bridge.

One example embodiment of the float-free link is particularly simple to manufacture and to use because it is a unitary integrally molded structure, requiring no assembly. The example float-free link is designed to break at a specific location, e.g., a narrowed breakaway bridge, when the strain exerted by the painter line exceeds the yield strength of the link at that specific location. Example float-free links may have single or multiple apertures configured for various and multiple fasteners to be attached to the device.

As used herein, the following terms should be understood to have the indicated meanings:

When an item is introduced by "a" or "an," it should be understood to mean one or more of that item.

"Comprises" means includes but is not limited to.

"Comprising" means including but not limited to.

"Includes" means has but is not limited to.

"Having" means including but not limited to.

"Mechanically coupled" means physically linked either directly or indirectly.

"Integrally formed" means formed as a single body or unit without physically separate subcomponents.

Floatable devices, such as life rafts, life buoys, or emergency radio beacons are normally secured to a vessel or watercraft by tethers when not in use. Such floatable devices are designed for use by the crew of said watercraft in an emergency. However, when the crew finds itself in a rapid sinking situation caused by, for example, when the structural integrity of the vessel is seriously compromised via a collision with another vessel or a reef, there may not be enough time to release all of the floating emergency equipment on a vessel. Other rapid sinking scenarios include, but are not limited to, explosions, fire, storms and the like. In such situations, the crew may find itself in the water with needed life rafts and emergency radio beacons still attached to the now submerged vessel.

It is therefore a desired safety feature for the floatable devices to breakaway from the submerged vessel. Marine regulations exist to promulgate safety on vessels. Marine regulations require a life raft to do two things: float free and automatically inflate if the vessel sinks. Some example embodiments of the present invention employ a hydrostatic release mechanism. The hydrostatic release mechanism may be configured to automatically trigger the release of a safety device, such as a life raft, when the life raft or other safety device submerges below a predetermined depth. For example, the release mechanism may be configured to sever a tether or other fastener lashing the life raft to the railing of the vessel. The life raft then starts to float to the surface because of its internal buoyancy, which stretches the painter line. Once it is taut, the painter engages a mechanism to inflate the life raft. After the life raft is inflated, its buoyancy force is supposed to break a float-free link that is connecting the painter line to the vessel to allow the life raft to float to the surface instead of being pulled down with the sinking vessel. See 46 C.F.R. §160.073.

U.S. Pat. No. 7,302,739, filed Apr. 22, 2003 and entitled "Device for Fastening Emergency Equipment to a Ship's Deck" generally describes a breakable device having multiple parts that may be used in attaching an emergency device to a ship's deck. The breakable device includes a plastic shearing link and a sleeve that is snap-fitted onto the shearing link. A wire having a set tensile strength extends around the plastic shearing link and is incorporated within the plastic shearing link. According to that patent's specification, the wire is designed to break once the life raft is opened and inflated to allow the life raft to float to the surface free from the sinking ship. In contrast, the float-free link described and claimed herein is believed to be significantly simpler and easier to manufacture and use than the breakable device generally described in U.S. Pat. No. 7,302,739.

FIG. 1 is an illustration of a hydrostatic release unit, according to an example embodiment of the invention. The example hydrostatic release unit 10 may include a hydrostatic release mechanism 12, a tether 20, e.g., a strong double-looped rope, cord, cable, line or other fastener, that may be used to attach the mechanism and the safety equipment to a vessel deck, rail or other attachment point, and a float-free link 30 as shown in FIG. 1. The hydrostatic release mechanism 12 may be of the kind that is described and claimed in U.S. Pat. No. 6,878,024 to Kohuth, filed Apr. 12, 2005.

Figure 2:
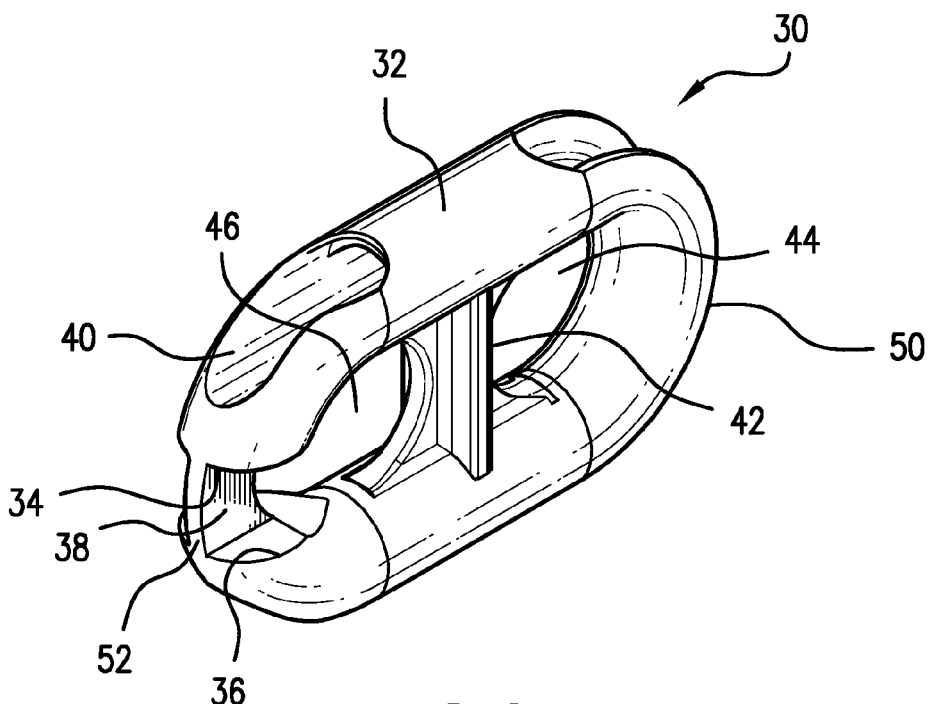
FIG. 2 is a perspective drawing of a first float-free link, according to an example embodiment of the invention.
Figure 3:
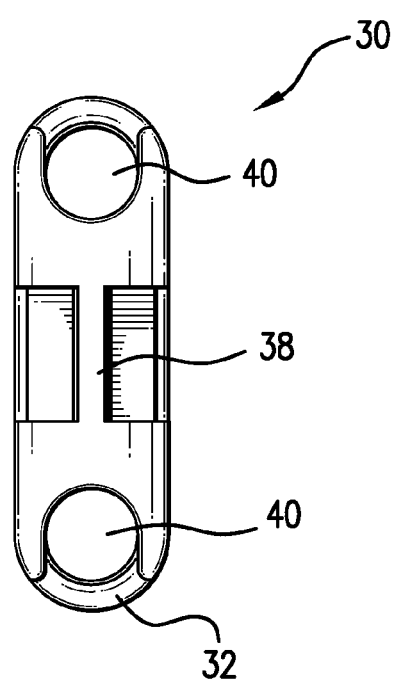
FIG. 3 is an end view of the float-free link of FIG. 2.

FIG. 2 is a perspective drawing of an example float-free link, according to an example embodiment of the invention. FIG. 3 is an end view of the float-free link of FIG. 2. The float-free link 30 may be an integrally formed unit, molded as a single piece. A polycarbonate material that is substantially stable to ultraviolet light may be injection molded to form the float-free link 30. The polycarbonate material may be made of any desired color. One possible material for use in making the float-free link 30 is the Makroblend UT-403 made by Bayer. This material is both stable to light and stable to weather, making it suitable for use in maritime applications where the emergency equipment such as the life raft may be exposed to the elements for years without being put to use. It will appreciated that other alternative materials, for example, UV resistant nylon or metal with a corrosion proof coating, may also be used to form the link. Of course, for safety reasons, the hydrostatic release unit or any of its components should be inspected and replaced as needed.

As more clearly shown in FIG. 2, the example float-free link 30 may be partially toroidal in shape and includes both a thick hollow tubular body 32 having closed ends 34 and 36, wherein the tubular body may be curved, and a thin breakaway bridge 38. The first and second ends 34 and 36 of the tubular body 32 may be fairly close to but separated from each other. As can be seen in FIGS. 2 and 3, the tubular body 32 may also be partially open along its length to permit the tether 20 to be easily threaded into the channel 40 of the tubular body.

The breakaway bridge 38 may connect the first and second ends 34 and 36 of the tubular body. The breakaway bridge 38 may preferably be curved to eliminate corner stress points which could cause premature breaking of the breakaway bridge. The bridge 38 may be sized, based on the physical properties of the materials from which it is manufactured, to break, at a given temperature range, between a minimum and a maximum force resulting from strain caused by the first external fastener (e.g., a painter line attached to a buoyant object that has been submerged) once the tether has been severed by the hydrostatic release mechanism. To achieve breakage in the link 30 at the breakaway bridge and not along a portion of the tubular body, the breakaway bridge 38 may be configured to have a tensile strength that is substantially lower than the tensile strength of the tubular body of the link. This may be achieved, for example, by configuring the breakaway bridge to have a substantially reduced cross-section as compared to that of the tubular body 32. The breakaway bridge 38 may be dimensioned so that it only breaks after predetermined minimum desired breaking force has been exceeded and before a predetermined maximum desired breaking force has been exceeded. It is advantageous for the breakaway bridge to be located in a different portion of the device than the location where the tether is attached to the link, so e.g., the breakaway bridge may be on one end of the device while the tubular channel is located on the opposite end. This allows better control of the breaking strength of the breakaway bridge and may help reduce problems with fouling.

The desired breaking range of the breakaway bridge may be dependent upon the particular application of the float-free link. For example, under current regulations, the minimum force is about 100 lbs and the maximum force is about 134 lbs for links intended to be used with life floats and other buoyant crafts of 10 persons or less capacity. For links intended to be used for life floats and other buoyant crafts of 11 to 20 persons capacity, the breaking range is between about 200 lbs and about 268 lbs. The specified range is from about 400 lbs to about 536 lbs for links intended to be used with life floats and other buoyant crafts of more than 20 persons capacity. See 46 C.F.R. §160.073. In one example embodiment, the example breakaway bridge 38 is designed to break at about 490±60 lbs within an operating temperature range between 150° F. to −22° F. That example embodiment, manufactured with Makroblend UT-403, had a bridge span of about 0.6 inch, a width of about 0.4 inch, a thickness of about 0.116 inch, and a radius of curvature of about 0.365 inches.

As shown in FIGS. 1-2, the float-free link 30 further includes a cross-bar 42 bisecting the link to create two apertures 44 and 46. The cross-bar 42 may be integrally formed within the link 30, e.g., during the injection molding process. The first aperture 44 is at the bottom 50 of the link 30, to be used with an external fastener, e.g., a shackle, to tie the link 30 to a vessel or a sturdy attachment point on the vessel deck. A portion of the tether 20 that is located inside the channel 40 of the tubular body of the link 30 is part of the connection with the vessel deck. The first aperture 44 is preferably circular to distribute evenly the strain caused by the fastener when the fastener is taut. The second aperture 46 is at the top 52 of the link 30, to be used to secure the link to a painter line of the life raft. A shackle may be used to mechanically couple the painter line to the float-free link 30. The aperture 46 may be elongated and narrower at the top end 52 of the link in the area of the breakaway bridge 38. This design facilitates the correct positioning of the external fastener from the painter at the breakaway bridge 38 when the painter is taut. The tether 20 is not a part of the connection to the painter line as the painter line must be able to break away from the vessel if the vessel sinks. The top end 54 of the tether 20 is attached to the life raft lashing. The hydrostatic release mechanism 12 is attached to tether 20 at a location along the length of the tether that is not contained within the channel 40 of the tubular body.

Figure 4:
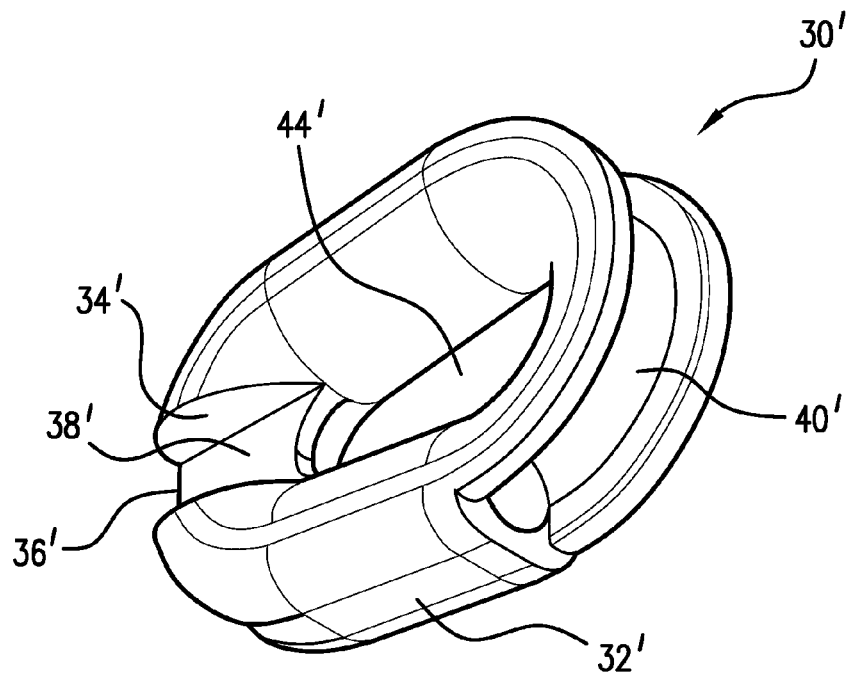
FIG. 4 is a perspective drawing of a second float-free link, according to another example embodiment of the invention.
Figure 5:
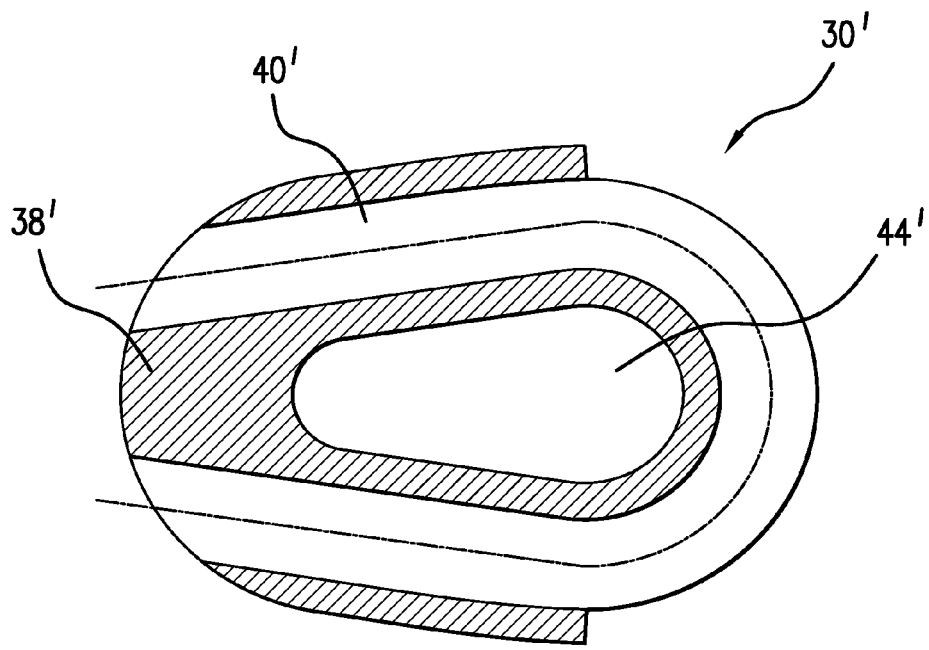
FIG. 5 is a cross-sectional view of the float-free link of FIG. 4.

FIG. 4 is a perspective drawing of a second example float-free link, according to another example embodiment of the invention. FIG. 5 is a cross-sectional view of the float-free link of FIG. 4. Similar to the previously discussed example embodiment, the float-free link 30' may be an integrally formed unit, molded as a single piece, from a suitable material that is substantially stable to ultraviolet light and weather, and having desired tensile strength characteristics. In this example embodiment, the example breakaway bridge 38' is designed to break at about 490±60 lbs within an operating temperature range between 150° F. to −22° F. Manufactured with Makroblend UT-403, the breakaway bridge 38' has a bridge span of about 0.4 inches, a width of about 0.74 inch, a thickness of about 0.116 inch, a radius of curvature of about 0.27 inch. The thickness must be tightly controlled to insure that the bridge has the proper breaking strength. The float-free link 30' may be configured with a single loop and thus a single aperture 44' in this example embodiment. The partially tubular body 32' of the float-free link 30' may be curved to form part of the closed loop. The breakaway bridge 38' connects the two ends 34' and 36' of the body 32'. Again, the body 32' may also be partially open along its length, wherein the channel 40' is configured to permit a tether to be easily coupled to the float-free link 30'. In this example embodiment, all external fasteners, e.g., shackles, for mechanically coupling the float-free link to an emergency device and to the vessel, may be attached through the aperture 44'.

FIG. 6 is a perspective drawing of a third float-free link 30'', according to yet another example embodiment of the invention. FIG. 7 is a top view of the float-free link 30'' of FIG. 6. Again, the float-free link 30'' may be an integrally formed unit, molded as a single piece, from a suitable material, such as Makroblend UT-403 or other appropriate polycarbonates. Similar to the float-free link 30' as illustrated in FIGS. 4 & 5, the float-free link 30'' may be configured with a single loop and thus a single aperture 44'' in this example embodiment. The partially tubular body 32'' of the float-free link 30'' may be curved into approximately a semi-circle and may have tubular channels 40'' similar to those described in the earlier embodiments. The breakaway bridge 38'' may be integrally coupled to the body 32'' via a connector 60. The connector 60 may be a full closed loop or a partial loop that is integrally formed with the body 32'' as long as, collectively, the float-free link 30'' contains a complete loop to facilitate the attachment of external fasteners.

Figure 8:
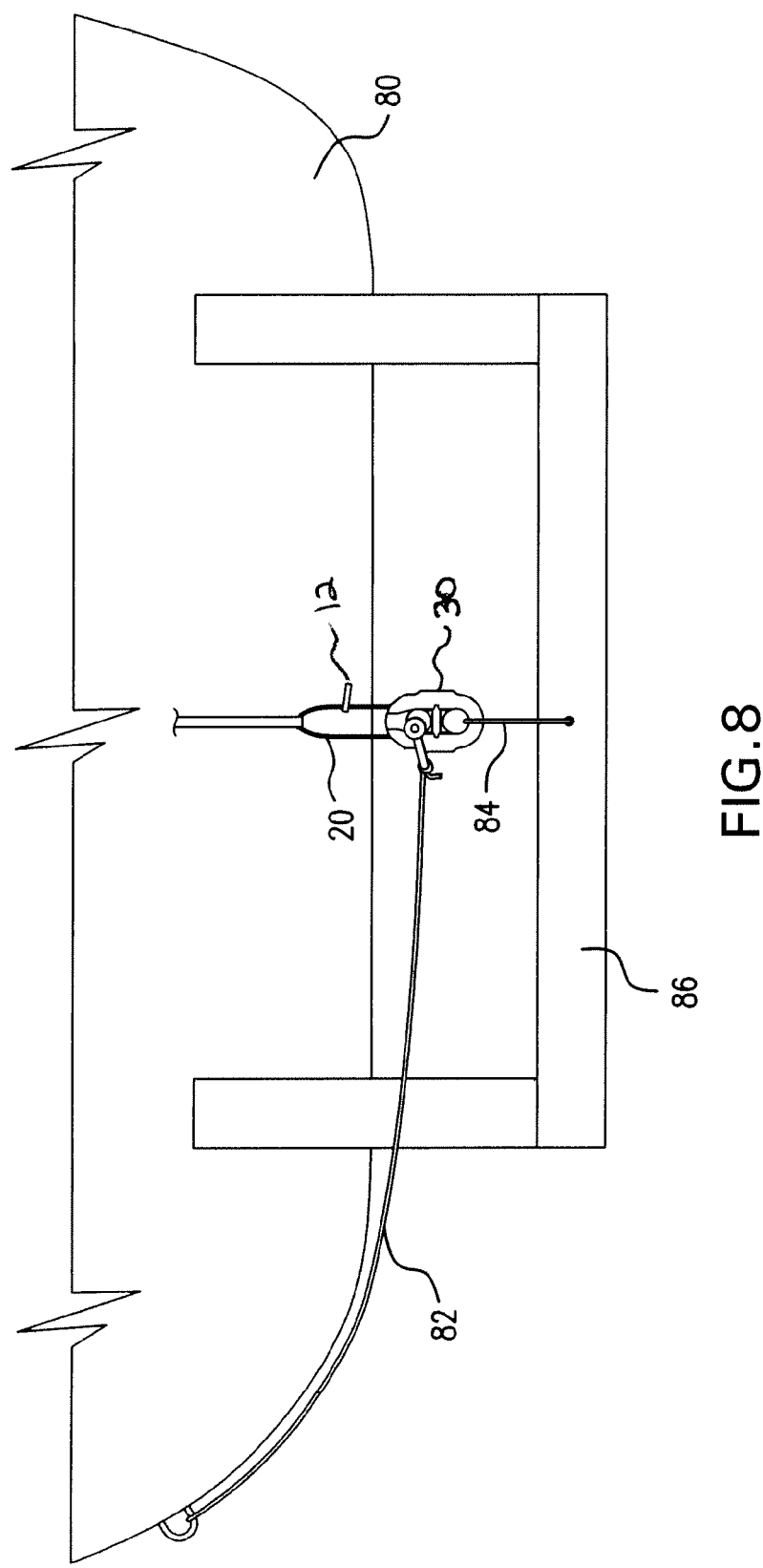
FIG. 8 is an illustration of an application of the hydrostatic release unit of FIG. 1, according to an example embodiment of the present invention.

In operation, a life raft or other safety equipment may be secured to a vessel by an example embodiment of the present invention, in the manner depicted in FIG. 8. A lifeboat 80 or other piece of emergency equipment may be secured to a mounting 86 or other strongpoint or deck attachment on a vessel. A link 30, as described previously, may be secured to the mounting 86, e.g., with a lashing 84. It will be appreciated that the alternative links described previously may also be used. The lifeboat may secured to the link in two ways, via a painter line 82 which may be attached to the upper aperture of the link 30 using an optional shackle, and via a tether 20. The hydrostatic release mechanism 12 is positioned so that it can sever the tether 20 when submerged. While the lashing 84 and tether 20 are shown directly attached to the link 30, shackles or other forms of indirect attachment could also be employed.

If the vessel sinks, the hydrostatic release mechanism will be activated at a certain predefined depth, such as 4 meters or less, to sever the tether. The tether connection between the vessel deck and the life raft (or other safety equipment) breaks and the life raft begins to float to the surface. However, the life raft is still coupled to the vessel via the painter line that is connected to the top aperture in the link 30. At a certain predefined depth, dependent upon the length of the painter line, the painter line will also become taut which then engages the mechanism to open and inflate the life raft. Moreover, the elongation of the aperture 46 with its narrower end at the breakaway bridge 38 causes the fastener from the painter line to position itself naturally at the breakaway bridge 38. Thus, the force of the taut painter line will strain the breakaway bridge. The breakaway bridge will break once its tensile strength has been exceeded. Importantly, the breakaway bridge should break neither too soon nor too late, and therefore should be designed to break only between a minimum and a maximum force within an expected temperature range, such as between 150° F. and −22° F. The minimum and maximum forces will be dependent upon the applicable regulations and the size of the life raft as discussed previously. If the breakaway bridge breaks prematurely, then the painter line will not have engaged the raft-inflating mechanism. If the breakaway bridge does not break at a maximum force, then the life raft will not break away from the submerged vessel and cannot float freely to the surface.

One advantage of some of the example embodiments described herein is that the float-free link 30 may be a unitary integrally molded structure. There are no parts to assemble, and therefore there is no risk of mis-assembly or components accidentally coming apart during use. Another advantage is that the example float-free link described herein is simple to use and can be combined with many forms of release mechanism and fasteners. Yet another advantage is that the link is designed to break at specific location, e.g., at the breakaway bridge, to avoid undesirable breakage in any other part of the link.

It will be appreciated that in an alternative example embodiment, the tether with the hydrostatic release mechanism may be physically separate and apart from the shackles or other connectors attached to the float-free link. In such an embodiment, it will be appreciated that the float-free link need not have a channel or other component for receiving the tether.

Although the foregoing specific details describe certain embodiments of the present invention, persons reasonably skilled in the art will recognize that various changes may be made in the details of this invention without departing from the spirit and scope of the invention as defined in the appended claims and considering the doctrine of equivalents. For example, although certain materials were described as being suitable for use in implementing the example embodiments described above, it will be readily appreciated that other materials may be used. The float-free link is not limited to being made from polycarbonate but may be made from other lightweight but weather durable materials with appropriate physical properties. Moreover, the specific dimensions of the breakaway bridge may be varied depending upon the physical properties of the materials used as well as the desired breaking force range. For example, lower tensile strength materials may require larger breakaway bridges, while lower desired breaking force ranges (for smaller or lighter weight emergency equipment) may require smaller breakaway bridges. Additionally, other types of attachments may be used in place of the tether 20. Also, the tubular body and the breakaway bridge need not be made from the same material but may be of different materials as long as both portions to the float-free link can be integrally formed. Moreover, two separate links may be coupled together to form the float-free link as long as one of the links has the breakaway bridge. Furthermore, any type of suitable hydrostatic release mechanism may be used in conjunction with the float-free link and tether to form a hydrostatic release unit. Other modifications and substitutions will also be readily ascertained by persons of ordinary skill in the art. Therefore, it should be understood that this invention is not to be limited to the specific details shown and described herein.

What is claimed is:

1. A float-free link, comprising:
a unitary integral first linkage means for allowing a first fastener to be attached thereto;
breakaway means unitarily and integrally formed with the first linkage means for controlled breaking of the float-free link between a minimum and a maximum force and at a specific location on the float-free link, the breakaway means configured so that breaking of the breakaway means releases the first fastener from the first linkage means; and
threading means unitarily and integrally formed with the first linkage means for allowing a second fastener to be threaded through a portion of an outer perimeter of the first linkage means so that the second fastener is not released by the breaking of the breakaway means.

2. The float-free link of claim 1, further comprising second linkage means for allowing a third fastener to be attached thereto, wherein the second linkage means is integrally coupled to the first linkage means.

3. The float-free link of claim 2, wherein the first linkage means and the second linkage means form a unitary integrally molded structure.

4. The float-free link of claim 1, wherein the first linkage means, threading means, and breakaway means form a unitary integrally molded structure.

5. The float-free link of claim 4 being composed of a plastic material that is substantially stable to ultraviolet light.

6. The float-free link of claim 5 wherein the plastic material is polycarbonate.

7. The float-free link of claim 1, wherein the minimum force is at least about 100 lbs and the maximum force is no more than about 134 lbs.

8. The float-free link of claim 1, wherein the minimum force is at least about 200 lbs and the maximum force is no more than about 268 lbs.

9. The float-free link of claim 1, wherein the minimum force is at least about 400 lbs and the maximum force is no more than about 536 lbs.

10. A hydrostatically-releasable device for fastening an emergency device to a vessel comprising:
a tether configured to mechanically couple the emergency device to the vessel;
a hydrostatic release mechanism attached to the tether, the hydrostatic release mechanism configured to sever the tether when the hydrostatic release mechanism is submerged below a predetermined depth;
a first external fastener mechanically coupled to the vessel;
a second external fastener mechanically coupled to the emergency device; and
an integrally formed float-free link having
a curved link body having at least one aperture configured to mechanically couple the float-free link to the first external fastener, and a channel extending around at least a portion of the at least one aperture, said channel configured to receive a portion of the tether threaded therethrough; and
a breakaway bridge integrally formed with the curved link body to form a closed loop, wherein the breakaway bridge is designed to break between a minimum and a maximum force resulting from strain exerted by the second external fastener once the tether has been severed by the hydrostatic release mechanism.

11. The hydrostatically-releasable device of claim 10, wherein the curved link body is partially a hollow tubular body which forms the channel through which the tether is threaded.

12. The hydrostatically-releasable device of claim 11, wherein the hollow tubular body is partially open along its length.

13. The hydrostatically-releasable device of claim 12, wherein the hollow tubular body is partially toroidal in shape.

14. The hydrostatically-releasable device of claim 10, wherein the breakway bridge has a tensile strength substantially lower than that of the rest of the curved link body.

15. The hydrostatically-releasable device of claim 14, wherein the breakway bridge has substantially reduced corsssection as compared to that of the rest of the curved link body.

16. The hydrostatically-releasable device of claim 10 wherein the breakaway bridge is dimensioned only to break after the minimum force has been exceeded and before the maximum force has been exceeded.

17. The hydrostatically-releasable device of claim 16, wherein the minimum force is substantially within a first range of about 100 lbs to 400 lbs and the maximum force is substantially within a second range of about 134 lbs to 536 lbs, and wherein the minimum force is less than the maximum force.

18. The hydrostatically-releasable device of claim 16, wherein the minimum force is at least about 100 lbs and the maximum force is no more than about 134 lbs.

19. The hydrostatically-releasable device of claim 16, wherein the minimum force is at least about 200 lbs and the maximum force is no more than about 268 lbs.

20. The hydrostatically-releasable device of claim 16, wherein the minimum force is at least about 400 lbs and the maximum force is no more than about 536 lbs.

21. The hydrostatically-releasable device of claim 10, wherein the tether is a rope.

22. The hydrostatically-releasable device of claim 10, wherein hydrostatic release mechanism is attached to the tether at a point along the tether that is outside of the channel of the float-free link.

23. The hydrostatically-releasable device of claim 10, wherein the curved link body has a cross-bar to divide the aperture into first aperture and second aperture, wherein the first aperture is configured to mechanically couple with the first external fastener and wherein the second aperture is configured to mechanically couple with the second external fastener.

24. A hydrostatically-releasable device for fastening an emergency device to a vessel comprising:

a tether configured to mechanically couple the emergency device to the vessel;

a hydrostatic release mechanism attached to the tether, the hydrostatic release mechanism configured to sever the tether when the hydrostatic release mechanism is submerged below a predetermined depth; and a first external fastener mechanically coupled to the vessel;

a second external fastener mechanically coupled to the emergency device; and an integrally formed float-free link having
  a unitary integral linkage means for mechanically coupling the first and second external fasteners thereto;
  breakaway means unitarily and integrally formed with the linkage means for controlled breaking of the float-free link at a specific location on the float-free link and between a minimum force and a maximum force resulting from strain caused by the second external fastener once the tether has been severed by the hydrostatic release mechanism;
  threading means unitarily and integrally formed with the linkage means for threading the tether through a portion of an outer perimeter of the linkage means so that the tether is not released by the breaking of the breakaway means.

* * * * *